(12) United States Patent
Motta et al.

(10) Patent No.: US 9,158,452 B2
(45) Date of Patent: Oct. 13, 2015

(54) EARLY DRAWING SYSTEM AND METHOD TO IMPROVE TOUCH SCREEN RESPONSE

(71) Applicant: Nvidia Corporation, Santa Clara, CA (US)

(72) Inventors: Ricardo Motta, Santa Clara, CA (US); Arman Toorians, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 149 days.

(21) Appl. No.: 13/728,185

(22) Filed: Dec. 27, 2012

(65) Prior Publication Data

US 2014/0184517 A1  Jul. 3, 2014

(51) Int. Cl.
*G06F 3/041* (2006.01)
*G06F 3/0488* (2013.01)
*G09G 5/36* (2006.01)
*G09G 5/08* (2006.01)

(52) U.S. Cl.
CPC ............ *G06F 3/0488* (2013.01); *G06F 3/0416* (2013.01); *G09G 5/363* (2013.01); *G09G 5/08* (2013.01); *G09G 2310/04* (2013.01); *G09G 2320/0252* (2013.01)

(58) Field of Classification Search
USPC .................................................. 345/173, 174
See application file for complete search history.

(56) References Cited

U.S. PATENT DOCUMENTS

| | | | |
|---|---|---|---|
| 2006/0262105 A1* | 11/2006 | Smith et al. | 345/179 |
| 2009/0267905 A1* | 10/2009 | Hsu et al. | 345/173 |
| 2009/0309849 A1* | 12/2009 | Iwema et al. | 345/173 |
| 2010/0038152 A1* | 2/2010 | Kaneda et al. | 178/18.07 |
| 2011/0001768 A1* | 1/2011 | Lin et al. | 345/698 |
| 2011/0279464 A1* | 11/2011 | Klask et al. | 345/545 |
| 2011/0310031 A1* | 12/2011 | Harris et al. | 345/173 |
| 2012/0030570 A1* | 2/2012 | Migos | 715/702 |
| 2013/0222294 A1* | 8/2013 | Choi et al. | 345/173 |

* cited by examiner

*Primary Examiner* — Jason Olson
*Assistant Examiner* — Deeprose Subedi

(57) ABSTRACT

A touch screen system includes a touch screen that provides touch information in response to a touch event. The touch screen system also includes a rapid response display controller having a reactive interpretation unit that provides an initial display representation of the touch information and a reactive feedback unit that provides the initial display representation to the touch screen for an initial display. The touch screen system further includes a routine response display controller that additionally receives the touch information and provides a final display representation of the touch information to the touch screen for a final display. A method of touch screen display management is also included.

17 Claims, 2 Drawing Sheets

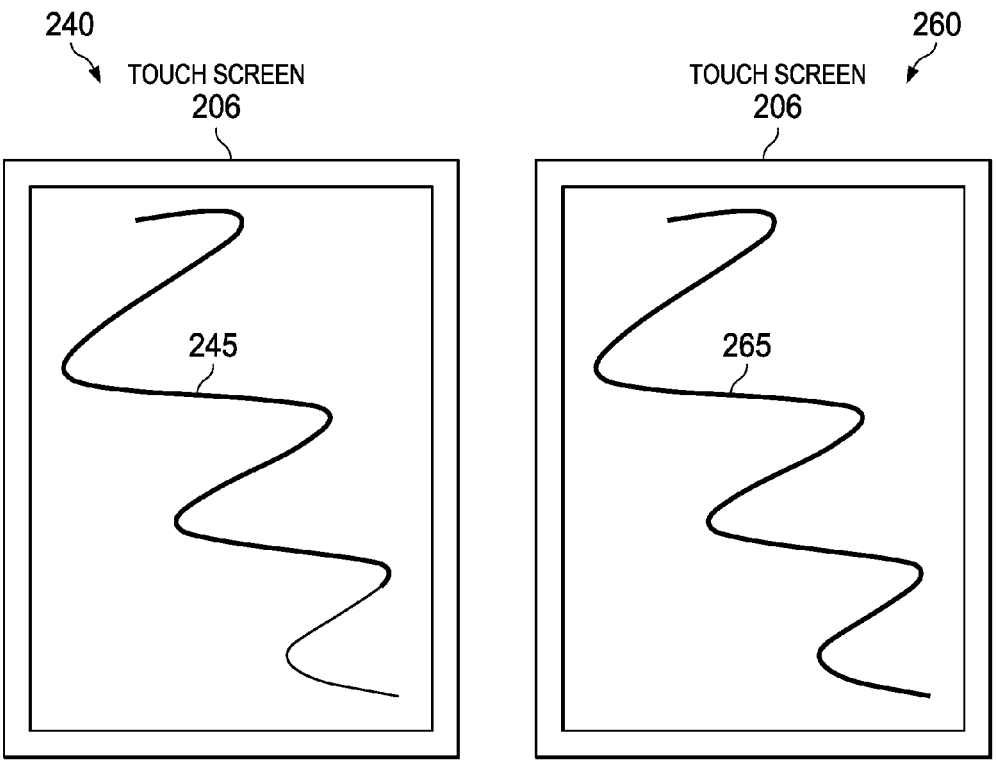
FIG. 2C
FIG. 2D
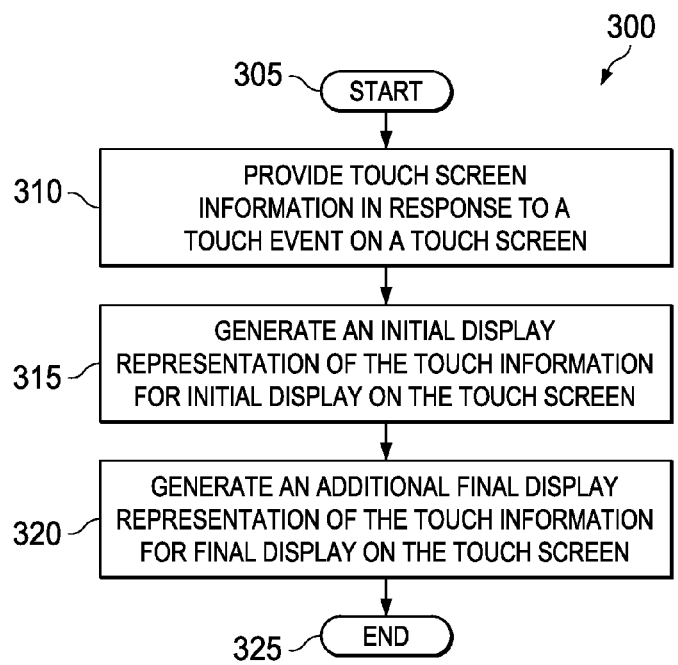
FIG. 3

EARLY DRAWING SYSTEM AND METHOD TO IMPROVE TOUCH SCREEN RESPONSE

TECHNICAL FIELD

This application is directed, in general, to touch screen devices and, more specifically, to a rapid response display controller, a method of touch screen display management and a touch screen system.

BACKGROUND

Touch sensitive screens in devices are rapidly gaining acceptance among users. Pen writing and drawing is a familiar task that most users can perform at very high speed and often at a high skill level. When using touch screens, the speed of display or screen response and feedback to a touch event is often a critical factor for success. The delay caused between the touch event and the screen update can generally interfere with overall user satisfaction and sometimes with their ability to successfully control the device. This can lead to erroneous results, a lack of productivity and general dissatisfaction with a product. Signing one's name at a cash register is exemplary of a poor experience with high-latency drawing and pen devices.

SUMMARY

Embodiments of the present disclosure provide a rapid response display controller, a method of touch screen display management and a touch screen system.

In one embodiment, the rapid response display controller includes a reactive interpretation unit configured to provide an initial display representation of touch information from a touch screen. Additionally, the rapid response display controller includes a reactive feedback unit configured to provide the initial display representation to the touch screen for an initial display.

In another aspect, the method of touch screen display management includes providing touch information in response to a touch event on a touch screen. The method also includes generating an initial display representation of the touch information for initial display on the touch screen and generating an additional final display representation of the touch information for final display on the touch screen.

In yet another aspect, the touch screen system includes a touch screen that provides touch information in response to a touch event. The touch screen system also includes a rapid response display controller having a reactive interpretation unit that provides an initial display representation of the touch information and a reactive feedback unit that provides the initial display representation to the touch screen for an initial display. The touch screen system further includes a routine response display controller that additionally receives the touch information and provides a final display representation of the touch information to the touch screen for a final display.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which:

FIGS. 2A, 2B, 2C and 2D illustrate touch screen examples for a touch screen system such as the touch screen system of FIG. 1; and FIG. 3 illustrates a flow diagram of an embodiment of a method of touch screen display management carried out according to the principles of the present disclosure.

DETAILED DESCRIPTION

A broad range of general users as well as many professional users (e.g., architects, designers, scientists, engineers and artists) would appreciate better control and an improved sense of interaction when working with touch screen devices. Many users remember their experiences with mechanical drawing toys, such as etch-a-sketch, which provided immediate feedback in response to an applied stylus. Generally, the display quality of writing depends on the speed of the feedback and not on whether the feedback contains fancy brushes or the right color. However, current touch screen applications rely on a higher latency signal path that uses general purpose display controllers, where operating system response will vary depending on the complexity of the calculations employed and other concurrent tasks being performed.

Embodiments of the present disclosure provide capabilities to enhance user experiences for touch screens by reducing latencies between touch events and corresponding touch screen renderings of these events (i.e., latencies between moment of action and reaction). An important aspect of these embodiments is that a faster, temporary response to a touch event is first provided that is later followed by a slower, permanent, more accurate response. This permanent response can overwrite, erase and replace, update or enhance the faster, temporary response.

Figure 1:
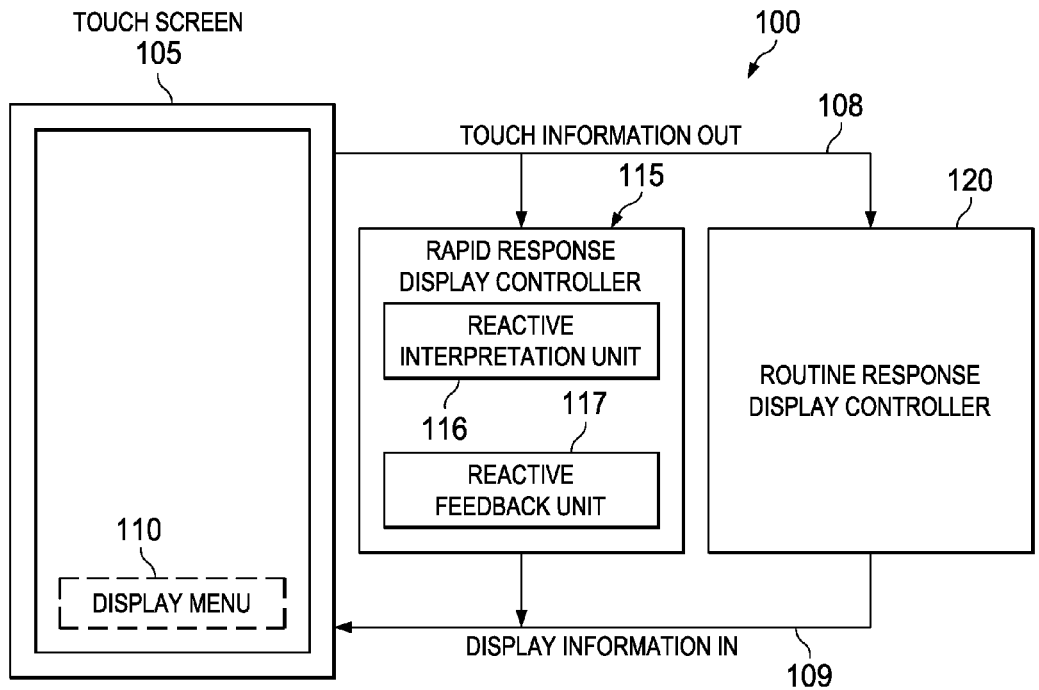
FIG. 1 illustrates an embodiment of a touch screen system constructed according to the principles of the present disclosure.

FIG. 1 illustrates an embodiment of a touch screen system, generally designated 100, constructed according to the principles of the present disclosure. The touch screen system 100 includes a touch screen 105 that provides a touch information output 108 and a display information input 109. Additionally, the touch screen 105 provides a display menu 110 that allows user selection of display attributes. The touch screen system 100 also includes a rapid response display controller 115 having a reactive interpretation unit 116 and a reactive feedback unit 117. The touch screen system 100 additionally includes a routine response display controller 120. Embodiments of the present disclosure may be employed with touch screens that operate based on capacitance, pressure, optics or fields, for example. Additionally, touch events referred to in this disclosure may be direct touch events or non-direct touch events.

The touch screen 105 provides touch information on the touch information output 108 in response to a touch event. The reactive interpretation unit 116 provides an initial display representation of the touch information, and the reactive feedback unit 117 provides this initial display representation to the touch screen 106 for an initial display employing the display information input 109. The routine response display controller 120 additionally receives the touch information over the touch information output 108 and provides a final display representation of the touch information to the touch screen 105 for a final display employing the display information input 109.

Embodiments of the present disclosure provide a novel way of controlling a touch screen display that includes an initial fast path interaction for the display from the rapid response display controller 115. This initial display response is then superseded by a display from a slower path provided by the routine response display controller 120. This approach enables a more immediate response to a touch event on the touch screen 105 wherein this rapid feedback enables better quality drawing and control before obtaining a higher quality image having selected attributes. Fountain pen or "wet brush" drawing programs are typically complex and their computational requirements are relatively large resulting in the slower path response.

In addition to program complexity and computational requirements, the functionally of the slower path provided by the routine response display controller 120 may include many operational steps. In one instance, an analog to digital conversion converts a physical analog touch event for the touch screen 105 into a digital format for capture by a panel or display controller (e.g., a microcontroller). The digital format is conveyed to an application processor (e.g., a central processing unit) wherein a device driver then provides this information to an operating system of the processor. The operating system in turn provides a graphics solution corresponding to the touch event and feeds the graphics solution back to a display driver and drawing frame buffer that updates the touch screen at the next display frame. This process may typically require several display frames to complete.

Several embodiments of the rapid response display controller 115 may serve as examples in providing the initial fast path interaction (i.e., the fast path) for a touch screen display. One embodiment employs a modified display controller that is additionally configured to provide fast path functionality corresponding to the rapid response display controller 115. The modified display controller may employ timing controller hardware that is usually provided with a touch screen display and provides the electronic interface and driving circuitry for the touch screen display. This is a separate piece of display hardware that contains logic circuitry closest to the display. In this embodiment, the modified display controller also processes touch events. The modified display controller can make rapid response decisions to provide an initial display representation of the touch information and feed it back to modify the touch screen display based on the touch information. This may often be accomplished in no more than two display frames.

Another embodiment employs a modified device driver (which may embody at least a portion of a software module) that is additionally configured to provide fast path functionality corresponding to the rapid response display controller 115. The modified device driver is "listening" to a display controller and receives information about an X-Y position of a touch event on the touch screen 105. This X-Y position information is passed directly into a drawing routine and the touch screen is updated without affecting generation of the final display representation provided by the routine response display controller 120.

FIGS. 2A, 2B, 2C and 2D illustrate touch screen examples, generally designated 200, 220, 240, and 260, for a touch screen system such as the touch screen system 100 of FIG. 1. These touch screen examples illustrate a progression of initial and final display representations that are constructed according to the principles of the present disclosure on a touch screen 206 for a single touch event. In FIGS. 2A through 2D, the locus of touch (i.e., the shape of the single touch event) remains constant. However, the FIGS. 2A through 2D show a display progression as may be seen over a series of display frames of the touch screen 206 for the single touch event.

Figure 2A:
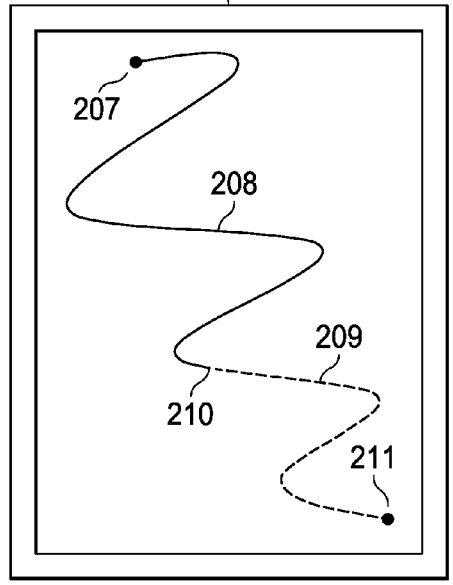

In the touch screen example 200 of FIG. 2A, the locus of touch intended for the single touch event is shown having a starting point 207 and an ending point 211. In this example, an upper portion (i.e., the solid portion) of the locus of touch indicates that part of an initial display representation 208 for the touch event has been provided for display in this display frame. A lower portion 209 of the locus of touch (i.e., the dotted portion) indicates that the initial display representation has not yet been provided for display in this display frame. Ideally, a current point of touch along the locus of touch would be at or close to an intersection 210, thereby allowing optimal visual feedback such as that provided by drawing or writing with a real pencil, ink pen or brush.

Maintaining the point of touch close to the intersection 210 requires that a frame rate of the touch screen 206 and a maximum generation speed for the touch event be closely coordinated. If the maximum generation speed for the touch event is greater than that supported by the frame rate of the touch screen 206, the point of touch is ahead of the intersection 210 along the locus of touch. For this case, the effective visual feedback is reduced somewhat, but still remains better than a case where the upper portion of an initial display representation for the touch event is not present.

Figure 2B:
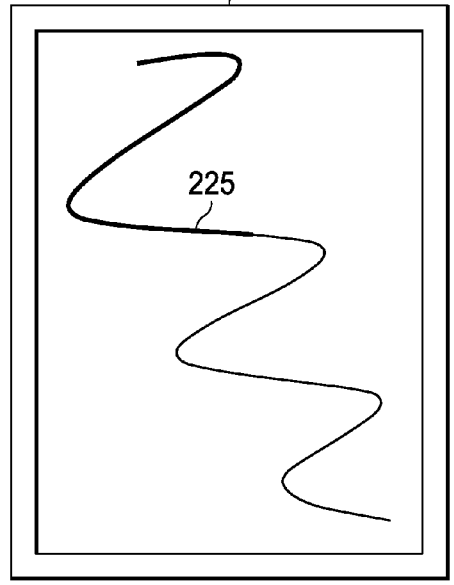

The touch screen example 220 of FIG. 2B illustrates a subsequent display frame of the touch screen 206 and indicates that the initial display representation of FIG. 2A has been completed. In the illustrated example, the initial display representation of the touch event is provided with a line width of one to two pixels to enhance user accuracy in generating the locus of touch intended for the single touch event. Of course, this line width is selectable along with line color.

Additionally, the touch screen example 220 includes a portion of a final display representation 225 for the touch event. The final display representation 225 employs the draft display representation as a guide line or center line to be overlaid or overwritten, in this example. As before, this line width is selectable along with line color. A shape of the final display representation 225 (e.g., a line shape corresponding to a line drawn with a fountain pen or a wet brush) is also selectable.

The touch screen examples 240 and 260 of FIGS. 2C and 2D illustrate additional subsequent display frames of the touch screen 206. Here, a greater portion of the final display representation 245 is shown in FIG. 2C, and a complete final display representation 265 is shown in FIG. 2D. Portions of the final display representation are seen to increase with each subsequent display frame and may provide a flowing effect depending on a frame rate of the touch screen 206 and a generation time required for a final display representation.

FIG. 3 illustrates a flow diagram of an embodiment of a method of touch screen display management, generally designated 300, carried out according to the principles of the present disclosure. The method 300 starts in a step 305, and touch information is provided in response to a touch event on a touch screen in a step 310. Then, in a step 315, an initial display representation of the touch information is generated for initial display on the touch screen. An additional final display representation of the touch information is generated for final display on the touch screen, in a step 320.

In one embodiment, the initial and final display representations are provided for the touch event being a direct touch event or a non-direct touch event. In another embodiment, attributes of the initial and final display representations are separately user selectable from a touch screen display. In yet another embodiment, separately user selectable attributes of the initial display representation or the final display representation include ones selected from the group consisting of a line color, a line width and a line style.

In still another embodiment, at least a portion of the initial display representation is generated in a display controller or a device driver associated with the touch screen. In a further embodiment, the final display representation overwrites, replaces, updates or enhances at least a portion of the initial display representation on the touch screen. The method 300 ends in a step 325.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A rapid response display controller, including:
   a reactive interpretation unit configured to provide an initial display representation of touch information from a touch screen; and
   a reactive feedback unit configured to provide the initial display representation to the touch screen for an initial display within two display frames from when said touch information is acquired by said reactive interpretation unit, wherein said rapid response display controller is separate from a routine response display controller, said routine response display controller configured to provide a final display representation after the initial display representation and after more than two display frames from when the touch information is acquired by the reactive interpretation unit, said final display representation different from said initial display representation.

2. The controller as recited in claim 1 wherein the initial display representation is provided for a touch event that is a direct touch event or a non-direct touch event.

3. The controller as recited in claim 1 wherein attributes of the initial display representation are user selectable from a touch screen display.

4. The controller as recited in claim 1 wherein user selectable attributes of the initial display representation include ones selected from the group consisting of:
   a line color;
   a line width; and
   a line style.

5. The controller as recited in claim 1 wherein at least portions of the reactive interpretation and feedback units are embodied in a display controller or a device driver in providing the initial display representation to the touch screen.

6. A method of touch screen display management, comprising:
   providing touch information in response to a touch event on a touch screen;
   generating, by a rapid response display controller, an initial display representation of the touch information for initial display on the touch screen within two display frames from when said touch information is acquired; and
   generating, by a routine response display controller, an additional final display representation of the touch information for final display on the touch screen; wherein:
   said rapid response display controller is separate from said routine response display controller; said final display representation is displayed after said initial display representation and after more than two display frames from when said touch information is acquired; and
   said final display representation being different from said initial display representation.

7. The method as recited in claim 6 wherein the initial and final display representations are provided for the touch event being a direct touch event or a non-direct touch event.

8. The method as recited in claim 6 wherein attributes of the initial and final display representations are separately user selectable from a touch screen display.

9. The method as recited in claim 6 wherein separately user selectable attributes of the initial display representation or the final display representation include ones selected from the group consisting of:
   a line color;
   a line width; and
   a line style.

10. The method as recited in claim 6 wherein at least a portion of the initial display representation is generated in a display controller or a device driver associated with the touch screen.

11. The method as recited in claim 6 wherein the final display representation overwrites, replaces updates or enhances at least a portion of the initial display representation on the touch screen.

12. A touch screen system, comprising:
   a touch screen that provides touch information in response to a touch event;
   a rapid response display controller, including:
      a reactive interpretation unit that provides an initial display representation of the touch information, and
      a reactive feedback unit that provides the initial display representation to the touch screen for an initial display within two display frames from when said touch information is acquired by said reactive interpretation unit; and
   a routine response display controller, separate from said rapid response display controller, that additionally receives the touch information and provides a final display representation, different from said initial display representation, of the touch information to the touch screen for a final display after the initial display representation and after more than two display frames from when the touch information is acquired by the reactive interpretation unit.

13. The system as recited in claim 12 wherein the initial and final display representations are provided for the touch event being a direct touch event or a non-direct touch event.

14. The system as recited in claim 12 wherein attributes of the initial and final display representations are separately user selectable from a touch screen display.

15. The system as recited in claim 12 wherein separately user selectable attributes of the initial display representation or the final display representation include ones selected from the group consisting of:
   a line color;
   a line width; and
   a line style.

16. The system as recited in claim 12 wherein at least portions of the reactive interpretation and feedback units are embodied in a display controller or a device driver in providing the initial display representation to the touch screen.

17. The system as recited in claim 12 wherein the final display representation overwrites, replaces, updates or enhances at least a portion of the initial display representation on the touch screen.

* * * * *